(12) United States Patent
White

(10) Patent No.: US 7,611,602 B2
(45) Date of Patent: Nov. 3, 2009

(54) METHOD OF PRODUCING MAPS AND OTHER OBJECTS CONFIGURED FOR PRESENTATION OF SPATIALLY-RELATED LAYERS OF DATA

(75) Inventor: Ian H. White, New York, NY (US)

(73) Assignee: Urban Mapping, LLC, San Francisco, CA (US)

( * ) Notice: Subject to any disclaimer, the term of this patent is extended or adjusted under 35 U.S.C. 154(b) by 1505 days.

(21) Appl. No.: 10/317,957

(22) Filed: Dec. 12, 2002

(65) Prior Publication Data

US 2003/0128865 A1  Jul. 10, 2003

Related U.S. Application Data

(60) Provisional application No. 60/374,564, filed on Apr. 22, 2002, provisional application No. 60/362,968, filed on Mar. 8, 2002, provisional application No. 60/341,136, filed on Dec. 13, 2001.

(51) Int. Cl.
 *B32B 38/14* (2006.01)
 *G09B 29/00* (2006.01)

(52) U.S. Cl. .................. 156/277; 434/150; 283/34; 359/619

(58) Field of Classification Search ................ 359/463, 359/455, 458, 619–621; 434/130, 150; 283/31, 283/105, 34; 156/277
See application file for complete search history.

(56) References Cited

U.S. PATENT DOCUMENTS

| | | | |
|---|---|---|---|
| 1,918,705 A | 7/1933 | Ives | |
| 4,094,596 A * | 6/1978 | Waly | ............... 353/27 R |
| 4,800,407 A | 1/1989 | Wah Lo | |
| 5,273,432 A | 12/1993 | White | |
| 5,349,419 A | 9/1994 | Taguchi et al. | |
| 5,359,454 A | 10/1994 | Steenblik et al. | |
| 5,457,515 A | 10/1995 | Quadracci et al. | |
| 5,554,432 A | 9/1996 | Sander et al. | |
| 5,642,226 A | 6/1997 | Rosenthal | |
| 5,695,346 A | 12/1997 | Sekiguchi et al. | |
| 5,715,383 A | 2/1998 | Schindler et al. | |
| 5,716,682 A | 2/1998 | Lovison et al. | |

(Continued)

OTHER PUBLICATIONS

PCT International Search Report, PCT/US02/39829 (Apr. 21, 2003).

*Primary Examiner*—Philip C Tucker
*Assistant Examiner*—Sing P Chan
(74) *Attorney, Agent, or Firm*—Marsh Fischmann & Breyfogle LLP; Kent A. Lembke

(57) ABSTRACT

A method of fabricating maps and other objects presenting multiple sets of spatially related information. Spatial alignment data, such as geographical boundaries is selected. First and second images are created by aligning or mapping first and second sets of information to the spatial alignment data. A lens sheet or lenticular material is fabricated, and based on the lens sheet configuration, the first and second images are combined to create an interlaced image including alternating strips from the first and second images. The interlaced image is printed on a substrate or the reverse side of the lens sheet, and the substrate is bonded to the lens sheet such that the interlaced image is sandwiched between the lens sheet and substrate. The first image is visible when the map or object is in a first position and the second image when the map or object is rotated to a second position.

20 Claims, 8 Drawing Sheets

U.S. PATENT DOCUMENTS

| | | |
|---|---|---|
| 5,847,808 A | 12/1998 | Goggins |
| 5,896,230 A | 4/1999 | Goggins |
| 5,924,870 A | 7/1999 | Brosh et al. |
| 6,060,720 A | 5/2000 | Gudehus |
| 6,073,854 A | 6/2000 | Bravenec et al. |
| 6,252,621 B1 | 6/2001 | Kessler et al. |
| 6,424,467 B1 | 7/2002 | Goggins |
| 6,493,972 B1 | 12/2002 | Williams |
| 6,732,120 B1 * | 5/2004 | Du .......................... 707/104.1 |

* cited by examiner

METHOD OF PRODUCING MAPS AND OTHER OBJECTS CONFIGURED FOR PRESENTATION OF SPATIALLY-RELATED LAYERS OF DATA

CROSS-REFERENCE TO RELATED APPLICATIONS

This application claims the benefit of U.S. Provisional Application No. 60/341,136, filed Dec. 13, 2001, entitled "Lenticular Map"; U.S. Provisional Application No. 60/362,968, filed Mar. 8, 2002, entitled "Multi-Layer Spatial Data Representation"; and U.S. Provisional Application No. 60/374,564, filed Apr. 22, 2002, entitled "Multi-Layer Spatial Data Representation," which are each incorporated by reference herein in their entirety.

BACKGROUND OF THE INVENTION

1. Field of the Invention

The present invention relates, in general, to structures using lenticular lens materials or sheets to produce images, and, more particularly, to maps and other information-presenting objects that include printed images having interlaced strips from multiple images that have been created based on discrete sets of data that has been aligned or mapped to a shared, single set of spatial data, such as coordinates defining a geographic boundary or a spatial boundary of a natural or manmade structure.

2. Relevant Background

The production and sale of printed maps is a large worldwide industry with the sale of consumer maps exceeding $400 million and other maps exceeding $2.5 billion (United States dollars). Maps are produced for numerous niche markets to provide select information on a single printed map with the look and feel of each map typically being different. For example, a tourist visiting a city would most likely purchase a street map to be able to drive in the city or otherwise navigate the unfamiliar city. The tourist would further use a tourist-oriented map providing locations of famous landmarks and places of interest. Often, this second map is provided in a different scale and is less accurate than the street map and may only show selected streets to try to minimize the information complexity of the map. The tourist further may need to use a public transportation map, such as a subway map, a bus map, and/or a train map. These transportation maps again provide only select geographic reference points, which may or may not be provided on the street map or landmark map, and may differ in scale and orientation from the other two maps. As a result, the tourist needs to carry three or more maps to navigate the city, and often will have difficulty translating information from one map to another, let alone finding the space to spread all of their maps out for viewing.

The problem of how best to present multiple sets of geographically related or otherwise spatially related information is not limited to map design and publishing. Architects and civil engineers typically use multiple drawings of a building or structure each showing different types of information, but this again requires a user to spread out or open the multiple drawings, which are generally quite large, at the same time to try to cross-reference information on the various drawings. Such drawings or portions of these drawings can include safety information such as evacuation routes, shelter locations, and the like to be used by building occupants. In the medical field, different systems of the human body are generally shown in different drawings making it difficult for a user to quickly identify the spatial relationships of the various systems. Overlays of partially transparent material have been used with some success in the medical field and other fields, but these overlay systems have not been fully adapted in part because a user is forced to flip back and forth between the pages to see the spatial relationships. The complexity of this information has led to the development of relatively sophisticated and expensive devices utilizing electronic and digitally-enabled methods, such as geographic information systems (GIS) for viewing maps and similar information and digitized anatomical atlases for organisms.

Hence, there remains a need for a method of producing maps and other informational devices that allows multiple sets of spatially-related information to be presented to a viewer or user while addressing the need to control information overload or high complexity. Preferably, such a method would be relatively inexpensive to implement, i.e., utilize existing technologies in new ways where practical, such that cost of the produced maps and other objects would be similar to currently marketed products. Further, it is desirable that the produced maps and objects have form factors that are similar to existing products to enhance user adoption of the new products.

SUMMARY OF THE INVENTION

The present invention addresses the above problems by providing a method of fabricating maps and other objects that are useful for presenting multiple sets of information in a spatially-related manner. The method includes selecting a set of spatial alignment data, such as geographical boundaries, spatial boundaries for a living organism, or a structural boundary of a manmade structure. A first image is created by aligning or mapping a first set or layer of information to the spatial alignment data, and then a second image is created by aligning or mapping a second set or layer of information to the same spatial alignment data. A lens sheet is provided or fabricated with desired lens or lenticule frequency, viewing distances, and viewing angles. Then, based on the lens sheet configuration the first and second images are combined to create an interlaced image including alternating strips from the first and second images. The interlaced image is then printed (typically on a substrate or directly on the reverse side of the lens sheet) and a substrate is bonded to the lens sheet such that the interlaced image is sandwiched between the lens sheet and the substrate. In some preferred embodiments, three or more images are provided by following similar steps to allow viewing of three or more images simply by rotating the map or object.

The interlaced strips are registered or aligned with the lenses of the lens sheet and the first image is visible when the map or object is in a first position (e.g., when rotated through a defined range of angles) and the second image is visible when the map or object is rotated to a second position (e.g., when rotated beyond the defined range of angles for the first image or through a transition or second viewing angle). In some embodiments, the combined image is formed such that at least a portion of the first image is visible concurrently with the second image, such as at a transition viewing angle or range of angles. In other words, the method of fabricating the map or object may be completed to support intentional ghosting or bleeding of one image into another to allow information from two sets of spatially-related data to be viewed at the same time, such as street information being visible or partially visible while viewing neighborhood, landmark, business, shopping, or other information where street information may be useful or such as a time series of spatially-related data including a manufacturing process within a specific framework or safety information such as an evacuation route being shown serially over a constant alignment framework.

More generally, presented herein is a new system of viewing multi-layered data representations that resolve the complicated issues of 'information overload' commonly present in data visualization, print-based products. The invention utilizes lenticular technology. In a lenticular map of the invention, different types of information are stored on different layers. When the angle of viewing is changed (by rotating the map in the hand), different layers will become visible, e.g., a street grid, subway map, evacuation route and/or others. The present invention allows users to reference sets of data without having to refer to different physical maps of different scale and iconographic systems.

The invention features a portable map, printed by at least one lenticular printing method, where a different type of information, is presented on each layer. The information can be of interest to tourists, naturalists, city planners, or others. Information of interests to tourists and travelers can include streets, public transportation, traffic flow, parking availability, neighborhoods, restaurants, cultural attractions, parks, architectural landmarks, hotels or shops. The information can be of a recreational type, and can include roads, topographic lines, recreational trails, natural features, water features, wildlife information, hazards and emergency services. The information can be of a type of interest to city planners and workers, and can include water mains, electrical utilities, telephone utilities, cable television utilities, fiber optic utilities, sewer lines, access tunnels, police precincts and zoning regulations. The information can be of a type of interest to scientists and students and can include organic systems of organisms, e.g., skeletal system, endocrine system and nervous system. The information can be of a type of interest to architects, engineers, designers and the construction industry and can include skeletal building composition, insulation, heating, ventilation and air conditioning (HVAC), plumbing, hydraulics, electrical systems and fuel systems. The information can be of a type of interest to safety and security professionals, and can include emergency evacuation routes and fire exits for airplanes, trains, submarines, transportation centers (airports, bus stations, train stations), convention centers, office buildings and other areas where the public would be required to move in an orderly and timely manner to escape possible injury.

The printing process can be, e.g., serigraphy, lithography, light valve technology (LVT), flexography, inkjet, web press, traditional photographic or digital photographic, etc. The map can be folded after printing, and packaged, if desired. The invention also features a portable information sheeting which includes: (a) a printed layer on a sheeting having information printed in a plurality of orientations; and (b) a lenticular structure on said sheeting, where only a first portion of the information can be viewed by a viewer from a first angle, and only a second portion of the information which is different than the first portion can be viewed by the viewer from a second angle.

In an additional aspect, the invention features a portable information sheeting including a lenticular structure having a first lens orientation and a second lens orientation, where the first lens orientation includes a first set of information formed on it, and the second lens orientation includes a second set of information formed on it, and where the first set of information can be viewed at a first angle by a viewer but not the second set of information at the first angle, and the second set of information can be viewed at a second angle which is different from the first angle while the first set of information cannot be viewed by the viewer from the second angle. Such a sheeting can also include additional layers, e.g., a third layer of information viewable from a third angle but not the first and second angles, and where the first and second layers of information cannot be viewed at the third angle. Additional layers of information (e.g., fourth layer, fifth layer, etc.), viewed at different discrete angles (e.g., fourth angle, fifth angle, etc), can also be added.

DETAILED DESCRIPTION OF THE PREFERRED EMBODIMENTS

The invention is directed generally to a method of making objects (such as maps) that are capable of presenting multiple layers of information or multiple sets of data. The invention is also directed to the objects fabricated according to the described method. Significantly, the information on each layer or each set of data is linked or tied together spatially. This is achieved according to the invention by first selecting a spatial reference system or frame (i.e., a set of shared spatial alignment data) and then creating a separate image or artwork representation of each set of data with reference to the shared spatial alignment data. A lens sheet or sheet of lenticular material is formed and a substrate is selected. The images representing the spatial data are used to form an interlaced image including alternating strips from the images, with the strips being selected to have a width matching the configuration of the lens sheet such that one of the images is visible at a time through the lenses of the sheet (or multiple images are visible in embodiments that utilize ghosting to allow viewing of information from two layers at a time).

The interlaced image is printed on the substrate (or on the lens sheet) and the substrate is bonded to the lens sheet with the lenses of the sheet being carefully aligned or matched with the strips of the interlaced image. The image may take a large variety of forms including graphic designs, photographs (e.g., aerial, time series, process, and other photographs), frames of video footage, and other numerous forms. To explain these ideas fully, the following description begins with a discussion of one object that can be successfully manufactured according to the invention, i.e., a map, and then proceeds to a discussion of exemplary steps in making objects capable of presenting multiple sets of spatially-related information.

Figure 1:
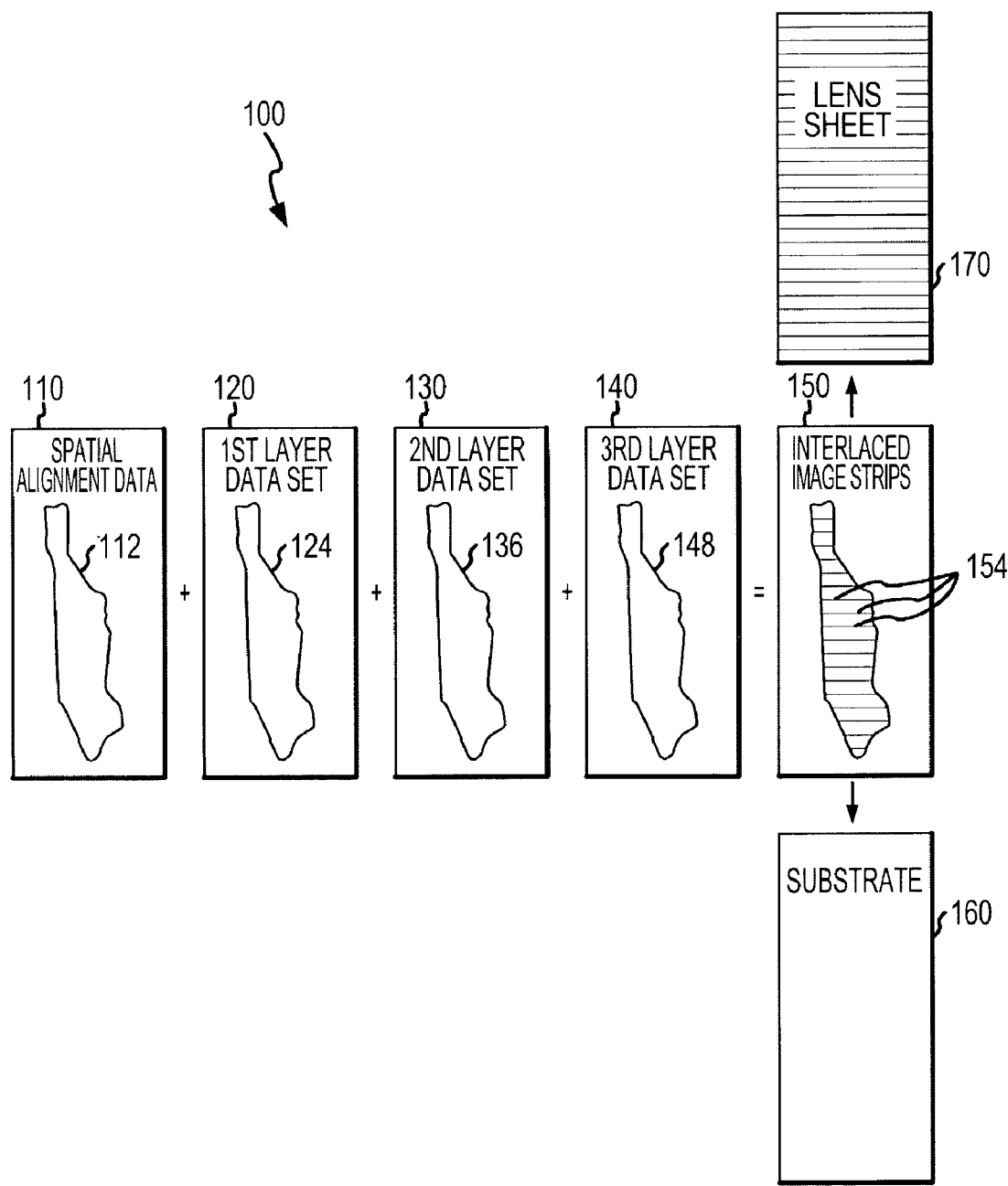
FIG. 1 is an exploded view of map fabricated according to the invention illustrating the alignment of multiple layers of information to shared spatial alignment data prior to the application of a lens sheet on a printed image of interlaced image.

FIG. 1 illustrates in exploded view a map 100 fabricated according to the present invention. A map 100 is selected for discussion as one preferred embodiment of the invention although numerous other objects can be fabricated according to the invention such as medical reference materials, structural and engineering figures, and the like and these other objects are considered part of the breadth of this invention as long as each layer or set of information is spatially related as described herein. According to an important aspect of the invention, the map 100 is formed based on a set of spatial alignment data 110 that provides a reference system or framework for presenting data in the map 100. In other words, each set of information or layers of data is spatially-linked or related to the spatial alignment data 110.

The spatial alignment data 110 can include nearly any information useful for defining a spatial reference framework such as coordinate points used in mapping, e.g., points of latitude and longitude, information useful for defining scale, shape, and the like and the particular data used is not considered limiting to the invention. Further, the spatial alignment data 110 (and the alignment of content in data sets 120, 130, 140) may be provided using geo-coded data and/or geographic information systems (GIS) technology and include GIS data. As another example, as shown, the framework 112 provided by the spatial alignment data 110 includes information useful for defining the outer boundaries of a geographical structure, i.e., an island as well as the scale of the framework 112, but the framework 112 could just as easily defined the boundaries of a country, a state, a city, or a portion thereof. Alternatively, the framework 112 could have been a building, a structure such as an airplane, a ship, an automobile, and the like, or a living organism such as a human body, an animal, a plant, or a portion thereof.

The map 100 further includes multiple layers of information or sets of data that are related to and referenced spatially to the spatial alignment data 110. These sets of information are shown by first layer data set 120, second layer data set 130, and third layer data set 140. The invention requires multiple data sets but the number can vary significantly from 2 to 12 or more depending on the configuration of the lens sheet (i.e., how many image strips can successfully and practically be supported by the lenticular material) with three layers or data sets being one preferred and useful arrangement. As shown, each data set includes a spatial framework 124, 136, 148 that is a copy of the framework 112 from the shared spatial alignment data 110. In this manner, the data in each layer data set 120, 130, 140 is directly referenced to the same, shared alignment data 110 and the information of each layer data set 120, 130, 140 is spatially aligned to the same reference points or coordinates, and importantly, to the data in the other data sets 120, 130, 140.

Spatial alignment of the information in each layer data set 120, 130, 140 is useful for allowing spatial relationships between information in each set 120, 130, 140 to be quickly identifiable by a user of the map 100. In prior lenticular devices, the illusion of motion or three dimensions was provided by utilizing a series of unique images that included similar content or information rather than different sets of information with the similar content being shown in a different spatial orientation to obtain the desired effect, e.g., movement, rather than showing unique information relative to a static spatial reference system (i.e., the spatial alignment data 110). The spatial alignment data 110 may be a visible framework 112 that is included in each added layer 120, 130, 140 with frameworks 124, 136, 148 but this is not a requirement and the spatial alignment data 110 may be simply information that is used to align the information in each layer data set 120, 130, 140 (such as a set of map coordinates or structural coordinates that do not directly relate to a physical structure or boundary as the boundaries of the shown island of framework 112).

The information or data in the sets 120, 130, 140 is typically presented graphically and/or with text and may include a wide variety of content. For example, in a medical reference application, the framework 112 may be the human body or a portion of a human body and the content in layer 120 may be the circulatory system, the content in layer 130 may be the skeletal system, and the content in layer 140 may be the nervous system. In the mapping embodiment shown for map 100, the content of the data in sets 120, 130, 140 may be selected from streets, neighborhoods, geographic and tourist landmarks, transportation routes (such as train, bus, and/or subway routes), and many more. Specific points of interest may be included in a layer as content such as lodging, restaurants, cultural attractions, parks, architectural landmarks, shopping, gas stations, universities, hospitals, and more. In some cases, one or more layers may include advertising content such as indicating the location of specific businesses that have paid to be included in the content of one or more layers. For example, a particular restaurant or hotel chain may be included in one or more of the data sets 120, 130, 140 to encourage map users to visit that business.

A map 100 can be designed with content to meet specific needs or for specific users or markets. For example, such maps may be useful for local governments to develop centrally-coordinated base maps to assist city workers with locations for specialized tasks, e.g., showing boundaries of various types (e.g., property, town, county, parish, state, etc.), water mains, electrical/telephone cables, soil composition, water tables, subways, tunnels, rights-of-way, police precincts, voting precincts, and the like, with each being shown on separate layers 120, 130, 140 or being combined in a useful manner in a single data set 120, 130, 140. The map 100 can also use spatial alignment data 110 from a rural or natural area and can contain information in the sets 120, 130, 140 of interest to those accessing such areas, e.g., topographic lines, different types of recreational trails, natural features, water features, wildlife information, hazards, emergency services, and the like.

The map 100 can be planned so as to serve themes or particular interests. While a map of "The City for Art Lovers" can contain information on museums, galleries, points of architectural interest, and the like in the data sets 120, 130, 140. A map of "The City for Nature Lovers" can contain information on parks, recreational trails, zoos, botanical gardens, and the like. Some information, e.g., street information, can be in common and appear in more than one such map directly by inclusion in more than one data set 120, 130, 140 or through intentional ghosting of information "shared" between layers 120, 130, 140 (as is explained below with reference to FIGS. 7-9. A map 100 of "The City in a Day" can contain important points of interest that a traveler might wish to see if given only one day in the locale. Likewise, a map of "The City in a Week" can contain the same points of interest, plus additional attractions that a traveler could reasonably see if spending a week in a given locale.

The map 100 can also be planned so as to provide information in a temporal context as it relates to technical processes and devices, e.g., manufacturing process of a silicon wafer or the assembly of a standardized food product, in which the content of steps of a process make up the content of the data sets 120, 130, 140 and the completed product outline or spatial framework provides the information for the spatial alignment data 110 (such as the outline of a completed food product shown as completed or shown as completed in exploded view or such as aerial views showing changes in geology and/or vegetation over time including plant blights and the like). In these embodiments, the "map" 100 can be used to provide in a serial fashion a set of information that is temporally related and spatially related. This can be thought of as a time series of spatially-related data which generally can include relatively any information in each layer data set 120, 130, 140 that is related spatially to the spatial alignment data 110 and aligned with the framework 112 but that is also related in time to the adjacent layers.

As a specific example of this time series concept, the map 100 or objects of the invention can be planned so as to support understanding of emergency exits and evacuation routes for certain places to support the needs of safety and security professionals. In these cases, the "map" 100 would utilize as the framework 112 the outer boundary or an inner structure of spatial reference systems including airplanes, submarines, trains, transportation centers (airports, bus stations, train stations), convention centers, office buildings and other areas where the public would be required to move in an orderly and timely manner. Each layer 120, 130, 140 would present one data set of information about the evacuation route relative to the emergency exits and with the route being displayed as changing in time relative to the consistent framework 112 to visually demonstrate the path(s) to be taken to exit the structure.

In general, the invention can be used to create any type of map or representation apparatus 100 where it is useful to make available multiple types of information that is spatially related, but where simultaneous display of all of such information types may result in "information overload" on the part of the user, and makes map viewing difficult or confusing, or inefficient at locating the information. The layered features of the map 100 allow viewing of select sets 120, 130, 140 of the entire set of information at a time and in a selectable fashion, i.e., by rotating the map 100 as is explained below.

The map 100 can also be planned so as to serve seasonal or other specific interests, e.g., "The City in Springtime", "The City During the Holidays", "The City During the Civil War", "The City for Children", "The Jewish Guide to the City", and the like. The "map" 100 or object fabricated according to the invention (not shown) can also be planned so as to support so-called "information graphics" which seek to explain through a combination of visual and narrative properties, e.g. "How the Titanic Sank," "How Buildings Stand," "What a Nuclear Submarine Looks Like," "How the Human Body Works," and the like. In these cases, the spatial alignment data 110 would typically define a structure or spatial object in one of these devices or a coordinate system for aligning spatially-related data.

To allow each layer data set 120, 130, 140 to be viewed individually the map 110 utilizes lenticular technology and includes a lens sheet 170 including numerous lenticules or elongate, parallel lenses, an interlaced image 150 including printed, alternating strips 154 formed from the data sets 120, 130, 140 and a substrate 160. Typically, the interlaced image 150 is printed on the substrate 160 that is then bonded to the prefabricated lens sheet 170 (e.g., a plastic material such as polyester, vinyl, polycarbonate, polyvinyl chloride (PVC), polyethylene terephthalate (PET), amorphous polyethylene terephthalate (APET), and the like. The configuration of the image strips 154 is selected carefully to match the frequency or pitch of the lenses in the sheet 170. Those skilled in the art will understand that lenticular technology and printing has been in use for a long period of time and is relatively well understood. Hence, the invention is not based on a specific technique of fabricating the lens sheet 170, printing or forming the interlaced image 150, a particular substrate 160 material, or a particular bonding technique. The following discussion of the particulars of lenticular technology and printing methods that can be used to form these components of the map 100 is provided for illustrative purposes but not as a limitation of the invention.

In general, the map 100 includes a lens sheet 170 including a transparent upper layer which has narrow parallel semi-cylindrical lenses (lenticules) on an outer surface and an image 150 on a substrate layer 160, which projects images through the lenticules. In some embodiments, the substrate 160 and lens sheet 170 are combined with the printed image being placed directly on the back or planar side of the combined sheet. The two layers provide an image to a user of the map 100, and different portions of the image are visible, depending on the angle from which the sheet is viewed, i.e., different data sets 120, 130, 140 are visible depending on the viewing angle. Maps and other objects made according to the invention enable viewing multi-layered data representations that resolve the complicated issues of 'information overload' commonly present in map and other information products.

The invention utilizes lenticular technology, which was first conceived in the 1880's and commercialized in the 1940's. Subsequent developments have increased viewing quality, printing techniques, visual effects and specialized applications (see, e.g., U.S. Pat. No. 6,252,621, which is incorporated in its entirety by reference herein). In a lenticular map 100 of the invention, different types of information are stored on different layers 120, 130, 140 interlaced in image 150. When the angle of viewing is changed (by rotating the map in the hand), different layers will become visible, e.g., a street grid, subway map, and/or others. This effect is generally called a 'flip' or phase change. Other effects may also be used and provided by the lens sheet 170 and image 150 combination. While similarly based on the lenticular printing method, these effects may reveal a static three-dimensional image (i.e., '3D'), one image evolving into another (i.e., 'morph'), and others. The present invention allows users to reference sets of data 120, 130, 140 without having to refer to different physical maps of different scale and iconographic systems.

There are a number of different types of lenticular printing that can be used to form the image 150 and strips 154 on the substrate 160. In large format continuous tone digital imaging, a paper, plastic or other substrate 160 can be mounted on heavy gauge rigid lenticular sheets, i.e., lens sheet 170. The large format tends to be economical in runs from 1 to 200 pieces. There are many types of large format processes, some using RGB lasers, some using inkjet and some using a photographic process. Another type is silk screening or serigraph, which can be done at varying line resolutions. Lithography is one preferred printing method for use in forming the map 100 because it is useful for hand-held distances.

Printing is performed based on the frequency of the lens sheet 170 which is often stated or given in lenticules or lenses per inch (LPI). Typically, the lens sheet 170 is configured with 10, 15, 20, 30, or 40 LPI and the printing is performed to match this frequency, with higher amounts being difficult to laminate. In general, a resolution of about 15 LPI is used for the flip effect desired in the map 100, i.e., the change from viewing one data set 120, 130, 140 to another in contrast to a 40 LPI frequency that may be used for a three-dimensional display.

There are many print production methods that can be used to create a lenticular image 150. These include, but are not limited to, offset (lithographic) printing, flexography, screen, digital, and traditional photographic processing. Each process has its own advantages and disadvantages, and those of ordinary skill can determine the optimal printing process for a given application. The table below shows some lens frequencies that can be used with or combined with different print production methods. Note, the LPI values provided represent a central point in a range with the given print processes being well suited for LPI values above and below the given LPI value.

| Print Process/ LPI | 10 | 15 | 20 | 30 | 40 | 50 | 60 | 75 | 85 | 100 | 140 | 200 |
|---|---|---|---|---|---|---|---|---|---|---|---|---|
| Large Format Inkjet | X | X | X | X | X | X | | | | | | |
| Offset | | | | | | | X | X | X | X | X | X |
| Flexography | | | | | | | | X | X | X | | |
| Traditional Photographic | X | X | X | X | X | X | X | X | X | X | X | X |
| Screen | X | X | X | X | X | | | | | | | |
| Digital Photographic | X | X | X | X | X | | | | | | | |

Lens frequencies currently available for use with sheet 170 that are generally geared for the offset environment include, but are not limited to, 60 LPI, 75 LPI, 79 LPI, 85 LPI, 90 LPI, 100 LPI, and 200 LPI. One limitation with offset printing is the gauge (thickness) of material that can actually fit through the printing press. This is usually no more than 35 mm (thousandths) thickness, and the press generally cannot take in material thicker than this. The printing can be performed directly on the lens sheet 170 itself, or on paper or card stock, i.e., the substrate 160, that is then mounted to the back of the lens sheet 170.

Screen printing can accept a wide variety of lenses and lens frequencies used in sheet 170, depending on a printer's capabilities and resolution. The resolution differs from screen printer to senigrapher. One should check that a printer has the capabilities to interlace in house so they can correct the films for the exact pitch of the lens sheet 170, which can vary from run to run in the plastic extrusion world. For example, a printer can receive a lens sheet 170 configured for 40 LPI and perform a pitch test only to find that it is really 40.04. This can throw off the quality, but before a costly error is made, in-house image setting and interlacing can proof this, and for this reason, it is typically preferable to fabricate the lens sheet 170 prior to producing the interlaced image 150. One should get a pre-production approval off the press whether printing is done by silk screen or serigraph such as by using a proof or match print. The benefits of screen print/serigraph are that they are fade resistant and environmentally stable in heat, humidity and freezing cold. Serigraph process lays down more pigment because the theoretical ink volume is greater. One should compare different printing products. For example, the serigraph is limited by size with bigger sizes distorting, while hand applied digital typically does not become distorted with increased size.

When choosing an offset process, printing volumes should be considered as well. Offset printing is not ideal for short run production, especially lenticulars because the setup and calibration of the press can take some time. In most cases, higher volumes are required and print runs of 5,000 pieces would be considered minimal. Normal print runs get into the tens of thousands and can easily get into the millions of prints. Silk screen/serigraph is generally considered a good choice for quantities of 250 to 5,000. Using a digital (inkjet or digital photographic) method usually requires that one print to a substrate 160 and then manually laminate the image 150 on the substrate 160 behind the lenticular sheet. This process is excellent for short run lenticular production and produces good results. A limitation of digital printing is resolution and volume. Resolution for digital devices ranges from 200 dpi to 1140 dpi. Whereas offset printing offers a much higher resolution, lower digital resolution can begin to limit one's choice of lenses for the sheet 170. The primary reason the choice is limited is that as the LPI increases, one needs a higher resolution print method to be able to image to that particular lens pattern. Also because digital printing uses a manual mounting method, high volumes are not economically feasible, which is why it is best for short print runs. Conversely, offset printing is not very economical at small volumes. Large format lenticular lenses can be purchased in very small volumes, while offset lenses are sold in much higher volume lots. Fortunately, there are now many lens choices on the market for the large format digital method that meet most needs. Lenticular lens sheet frequencies currently available on the market for the large format digital environment include but are not limited to, 6 LPI, 10 LPI, 15 LPI, 20 LPI, 30 LPI, 40 LPI, and 50 LPI.

In an alternative embodiment, the image 150 with interlaced image strips 154 is provided with imaging technologies other than standard ink printing and offset printing as discussed above. For example, an electronic ink display that provides a desired resolution can be used to provide the interlaced image strips 154 and image 150 as well as providing the substrate 160, e.g., as part of the display element. Such an electronic display may be desirable for increasing the number of data sets that can be displayed depending upon the obtained resolution of the electronic ink display. Further, the use of an electronic ink display to provide the image 150 would allow the content of the data sets 120, 130, 140 and even the spatial alignment data 110 to be modified or replaced on demand or periodically. For example, a single map 100 can be used to display different spatial alignment data 110 with differing data sets 120, 130, 140 to allow a traveler to quickly view different locations (such as on demand selection of a map of one portion of New York City and then selecting another portion of New York City or a portion of the state of New York). A periodic updating of such data sets 120, 130, 140 but not the alignment data 110 may be useful for periodically updating transportation information (as bus lines or subway lines change), to update landmarks, lodging, restaurants, and the like, or to otherwise modify the content of the map 100 or of one or more layers of the map 100. The specific electronic ink technology utilized for the image 150 is not limiting to the invention and is, hence, not discussed in detail, but could be a display similar to that developed for handheld computing devices such as PDAs and electronic books (e.g., see products being developed by E Ink Corporation, Philips Components, Lucent Technologies, Xerox Corporation, and/or other electronic ink technology developers and/or distributors).

Figure 2:
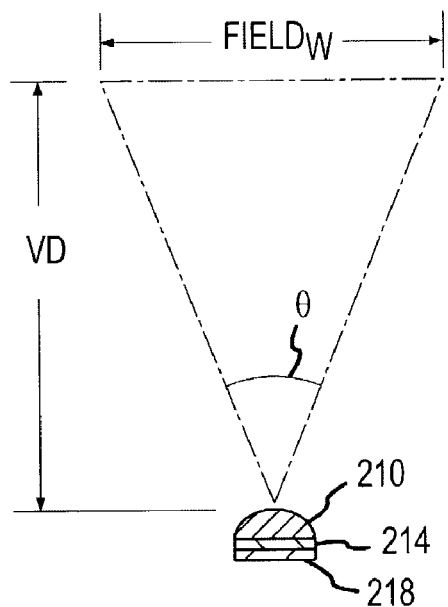
FIG. 2 is a simplified sectional view of a single lens or lenticule showing the concepts of viewing angles, viewing distances, and fields of vision that are utilized in the maps and other objects of the invention.

The lenses in the sheet 170 are typically designed with characteristics that enhance certain capabilities. Lenticular effects can be broken down into two primary categories, "flip" and 3D. Within each category additional effects are available. Referring now to FIG. 2, an individual lens or lenticule 210 is shown with a portion of the image 214 (such as an image point of a strip 154) and the underlying substrate 218. Every lenticular lens 210 on sheet 170 has a certain viewing angle, θ. This viewing angle, θ, is designed into the lens 210 to favor certain outcomes. For example, 3D lenses have a relatively narrow viewing angle, usually less than 30°. Animation lenses have a wider viewing angle, usually more than 40°. Lenses that fall between 30° and 40° are usually general-purpose lenses that offer good 3D and good animation capabilities but may not be outstanding in either. These lenses would be an acceptable choice for an animated 3D image, for example. Narrow viewing angles have less room under each lenticule (a single lens) 210 while wide angle lenses have more room under each lenticule 210. The viewing angle, θ, is determined in part by the radius of the convex lens 210 and gauge of the material in sheet 170.

The viewing angle, θ, and viewing distance, VD, are somewhat associated with one another. As FIG. 2 illustrates, in large format lenticular lenses 210, the further away one is from the image, the more a viewer must move left or right in front of the image in order to get the complete effect. This is also true for smaller handheld lenticular images where the viewer usually rocks the image back and forth instead of left to right. The further the viewing distance, VD, and the wider the viewing angle, θ, the slower the flip effect because of the need to move more left to right or right to left. Obviously, for a narrow viewing angle, θ, one would need to move a shorter distance in order to complete the lenticular effect, i.e., to move from one field of vision (shown havening a width, Field$_W$) to another and to see change from viewing one image or data set 120, 130, 140 to another image or data set 120, 130, 140.

Viewing distance, VD, also affects lens 210 choice because of what can be called the "billboard" principle. That is, as the viewing distance, VD, increases, the coarser the lens material one will want to use (i.e., the lower frequency of the sheet 170). The reason for this is that too fine a lens sheet 170 for distant viewing will actually degrade the image quality because the fine lens loses detail at greater distances. On the other hand, one may not want to use a coarse lens for a handheld image, such as that viewable from a map, because the lens 210 will degrade the quality by obscuring the details of the image 150 underneath by placing too coarse a lens 210 on top of the image 150. Put another way, billboard printing resolution is quite coarse when compared to offset printing. This is because the viewing distances, VD, of both are radically different.

To achieve optimal visual results for the map 100, a certain amount of research and development with prototyping may be useful. Embodiments of the map 100 have used lens sheets 170 with frequencies of 75, 90, and 100 LPI configured (such as with an appropriate viewing angle, θ) to obtain a useful viewing distance, VD, for handheld items such as the map 100, of about 9 to 15 inches. The data sets 120, 130, 140 may include information in the form of text. Typically, smaller font sizes are preferred to allow inclusion of more information in text form, and in one embodiment, text down to a 7.5 point font was included in the image 150 formed from the layer data sets 120, 130, 140. A number of font types can be used to achieve a desired look and clarity, such as sans serif, but preferably, the text is selected with a font type and size that allows the text to be read in all viewing directions through the lens sheet 170.

Figure 3:
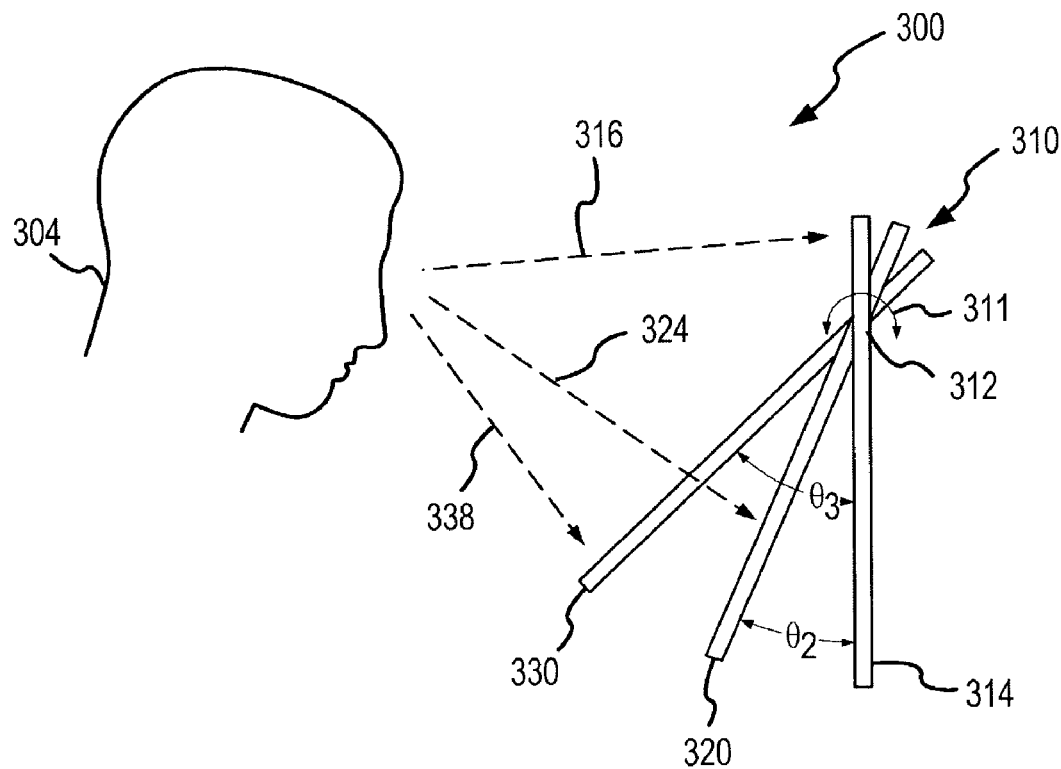
FIG. 3 is a simplified side view of a user rotating a map or object fabricated according to the invention (such as the map of FIG. 1) to view the multiple layers of information contained in the map or object.

According to one embodiment of the map 100, only one of the data sets 120, 130, 140 is visible through the lens sheet 170 at a time. To view another data set 120, 130, 140, the map 100 must be rotated to another viewing angle (or range of angles) or the viewer must move to a different field of vision while leaving the map 100 stationary. This concept is shown in FIG. 3 in a viewing process 300 is illustrated. A viewer or user 304 is viewing a map or other object 310 formed according to the invention. At an initial position of the map 310, the viewer 304 views (as shown by line 316) a first image 314 representing information (graphic and/or text) of a first layer data set (such as set 120). When the map 310 is rotated (as shown by arrow 311) about a point 312 through a transition angle, $θ_2$, the viewer 304 views (as shown by arrow 324) a second image 320 corresponding to the information (graphic and/or text) of a second layer data set (such as set 130). In other words, the first image 314 is visible between a first position and a position defined by the transition angle, $θ_2$, at which time the image 314 phases or flips into the second image 320 or this can also be considered changing from one viewing angle to an adjacent viewing angle as discussed with reference to FIG. 2. Likewise, in a 3-layer or 3-set embodiment, the second image 320 is visible to the viewer 304 until the map 310 is rotated 311 through another transition angle, $θ_3$, at which time the image 320 phases into or flips to a third image 330 viewed (as shown by arrow 338) by the viewer 304 and corresponding to information in a third layer data set (such as set 140).

In this embodiment 310, each data set is presented in a separate image 314, 320, 330 but the data in each image 314, 320, 330 correspond to a set of information that is spatially related to each other and aligned with an underlying or shared set of spatial alignment data (such as data 110). This can best be understood with reference to FIGS. 4-6 that show a simple example of the type of graphical and text information that may be included in the views 314, 320, 330 and corresponding layer data sets. As shown, the first data set of the map 310 includes street level information in graphic and text form to provide the view or image 314. In this example, the map 310 utilizes a portion of an island (such as Manhattan Island in New York City, N.Y., USA) for the spatial alignment data with the external border 410 providing a reference system or framework for achieving spatial alignment of each layer of data in each view 314, 320, 330. As shown, the streets 420 are shown graphically and with text labels and are spatially-aligned with the spatial alignment data (e.g., framework 410).

Figure 5:
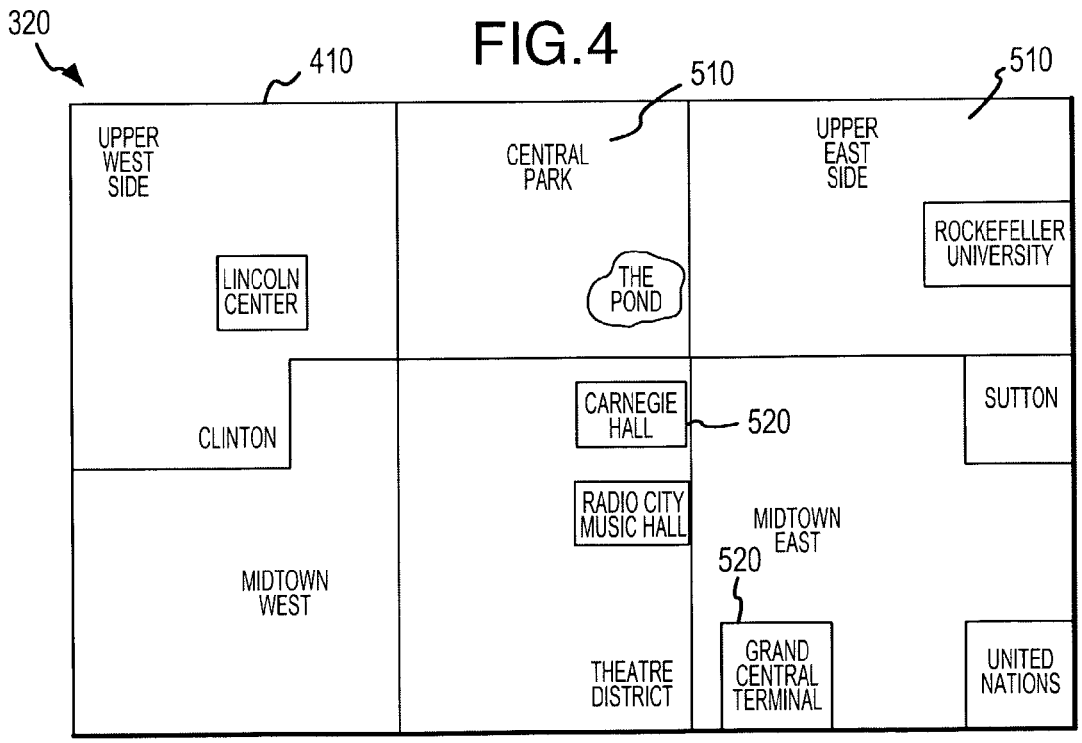

FIG. 5 illustrates an exemplary second image 320 in which the underlying second layer data set includes neighborhood information 510 that is shown graphically with lined borders and with text labels and also includes landmark information 520 shown graphically and with text labels. In the second image 320, the second layer data set is again aligned spatially with the same framework 410 or spatial alignment data as the information in the first image 314, which allows the viewer 304 to rotate 311 the map 310 to quickly view the two images 314, 320 and readily determine the spatial relationship of information in the two data sets (e.g., which streets certain landmarks are near or on) without being overloaded with information when viewing either of the images 314, 320. Additionally, a third view 320 can be viewed by rotating 311 the map 310 through another transition angle, 2, and the third view 320 includes a third set of data (i.e., transportation data such as subway routes) that is spatially aligned with the same framework 410 defined by the shared spatial alignment data. The image 320 includes graphic information of where transportation runs relative to the framework 410 and textual information is used to show where transportation can be boarded. The transportation information of image 330 can be provided in a clear, concise fashion but can also be cross-referenced with information in the other views 314, 320 by rotating 311 the map 310 through the transition angles, $\theta_3$ and $\theta_2$, which can also be thought of as switching from one viewing angle to another for the lenticules in the map 310 (e.g., see, the discussion with relation to FIG. 2). In this manner, a single map or object (such as map 100 of FIG. 1) can be utilized to present information from multiple sets of data in a manner that spatially relates the data to a single reference set of alignment data (such as selected coordinates, geographical boundaries such as a coastline, or a combination thereof).

The "layers" of the invention are meant to include any information intended to be viewed by the viewer 304 when the map 310 is held at a particular angle. "Layer" is therefore intended to include the display of what might be deemed different types of information on a single layer for example where the lenticular printing is combined with other means of separating the information. For instance, a given "layer" containing information on streets can also contain information on a public transportation system, if, for example, the public transportation system information is in a different color than the street information. For instance, a map of "New York City in a Day" can contain a first layer (viewable from a first angle or range of angles) containing street information in black and white and public transportation in different colors, a second layer (viewable from a second angle) displaying the streets in black or fine line and "must see" sights, e.g., the Statue of Liberty, Empire State Building, Rockefeller Center, etc., and a third layer (viewable from a third angle) showing the streets in black or fine line and restaurants and cafes near the sights featured on the second layer.

With maps 310 of the invention, the viewer 304 can focus on a map location while viewing the map 310 from one angle, then "flip" the map to a different angle while maintaining his point of focus, thereby bringing into display new information on the geographic area. That is, it may be convenient to place, e.g., street information, within every layer, but there is no requirement to do so. One of ordinary skill in the art of lenticular printing and graphic design can therefore balance various interests, e.g., reducing costs by placing less information in each layer versus increasing the overall usefulness of the map to the viewer by providing more information per layer, or more layers.

In some embodiments of the invention, ghosting (or viewing of data or images from other layers) is intentionally allowed or enabled to present information from one or more of the other "secondary" layer data sets when viewing a "primary" layer data set. For example, in FIG. 1, the first layer data set 120 may include street information and the second layer data set 130 may include subway information and it may be useful for the "secondary" street information to bleed into or to ghost into the "primary" subway information to assist a viewer in locating a subway entrance relative to a particular street or street intersection. In some cases, a single one of the data sets (such as set 120) may be used continuously as a "secondary" data set such that it ghosts through when viewing all other data sets (such as sets 130 and 140). This may be useful for providing an underlying base map in all views. In other embodiments, the previous or adjacent layer that was viewed or portions of that data set will be intentionally ghosted to the next viewed layer for the entire viewing range or angle or for only the first portion of that viewing range at which point the "primary" data will be the only data shown in the image. This arrangement may be considered useful for allowing a transitional shift between two data sets (such as between a street map to a neighborhood map) without requiring a user to flip back and forth to different views or images to retrieve previously viewed information. In past lenticular devices ghosting has been avoided to achieve higher quality.

Figure 4:
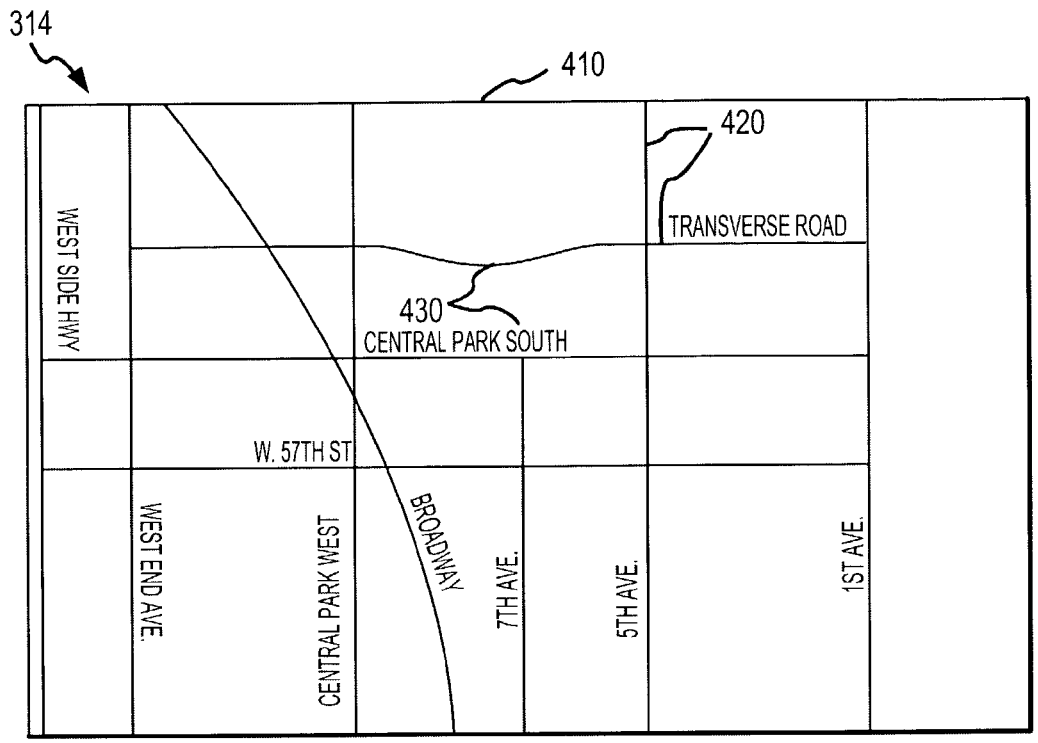
FIGS. 4-6 are plan views of the map views visible in FIG. 3 by the user at the three viewing angles (or ranges of viewing angles)
Figure 6:
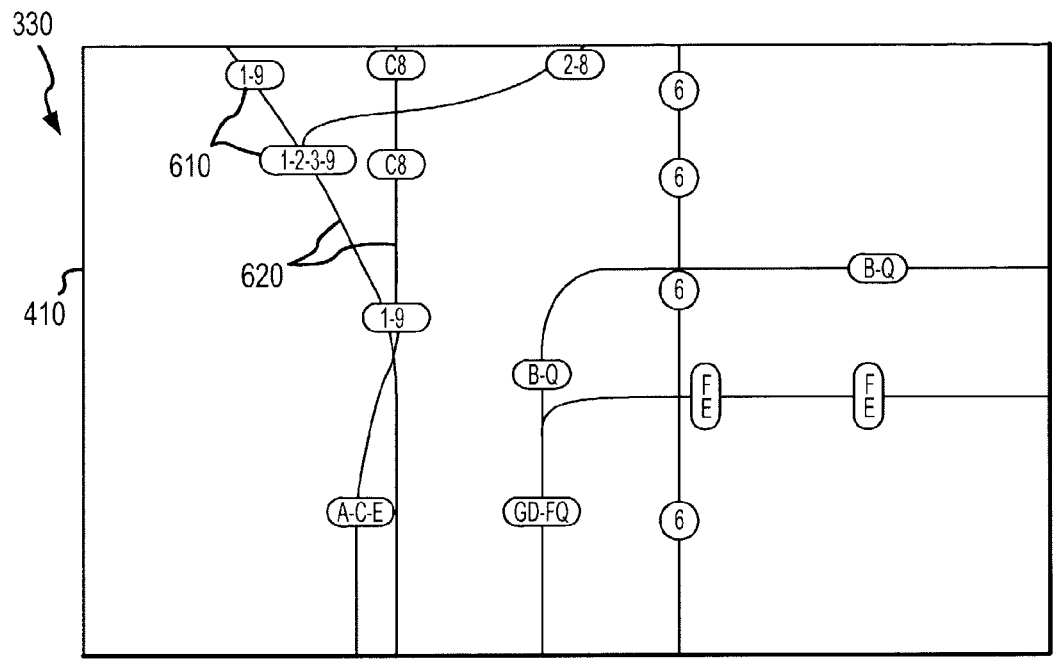

To achieve ghosting, the color contrast is maximized such that colors or images of later or primary layers do not (at least initially) block or cover colors or images of earlier or secondary layers. For example, if a text message or image (i.e., "DOG") was to be ghosted, it may be provided in a dark ink such as black with no dark image or colors used in the overlapping area in layers that it is desirable to ghost the text message. In other cases, a lighter ink can be used or a dark, blocking image is provided in the later or primary image to prevent or control ghosting of the image. Generally, strong color contrast is desired to cognitively reinforce the visual changes between layers or views, and with this in mind, the combining or ghosting of distinct sets of data into one layer preferably is done with an eye to what is visually effective. For example, if one data layer includes information about subway lines and another layer includes neighborhood data, these two layers can be ghosted without too much difficulty with the subway lines showing relatively clearly with the boundary lines and coloring of the neighborhood areas. However, similar data layers (such as bus lines and streets or subways and bus lines) and complex or busy data layers typically are better suited for exclusive views (such as shown in FIGS. 4-6).

Figure 7:
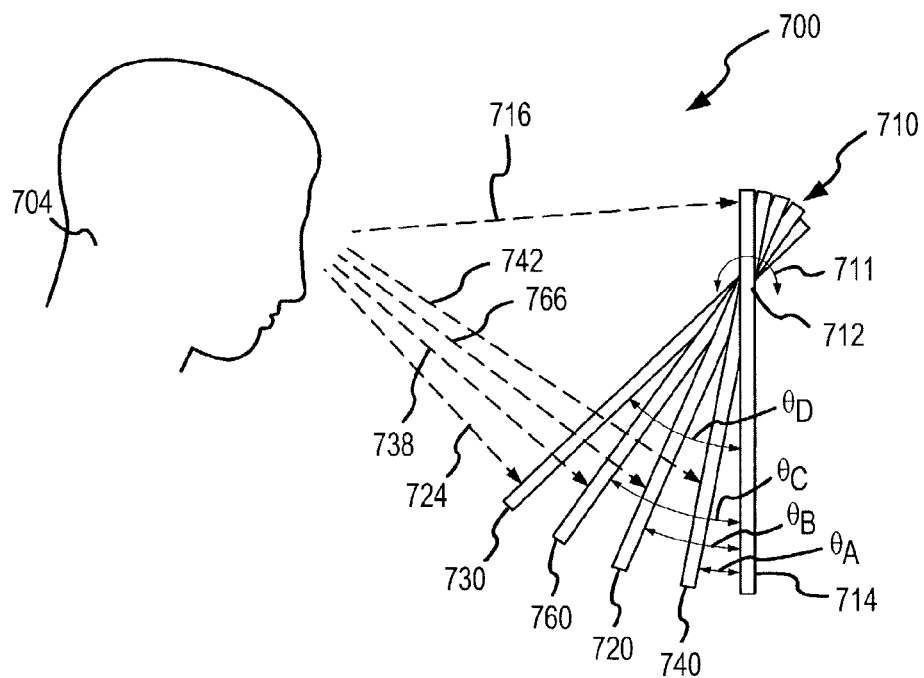
FIG. 7 is a side view similar to FIG. 3 showing another embodiment of the invention in which ghosting is intentionally provided such that at intermediate or transition viewing angles (or, more accurately, ranges of viewing angles) information from two information layers or data sets is concurrently visible to the user.
Figure 8:
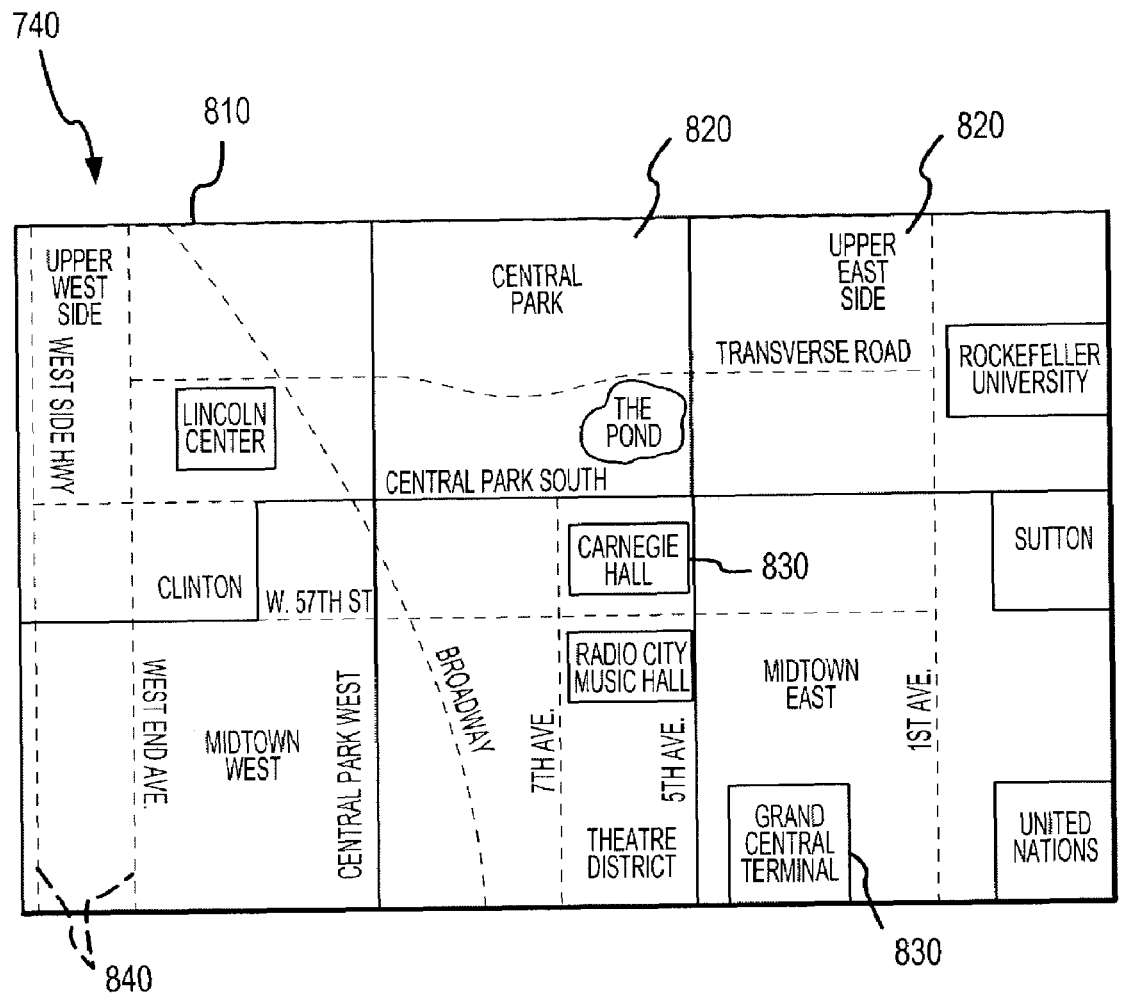
FIGS. 8 and 9 illustrate the transitional or ghosted images that are visible by the user of FIG. 7 when the map or object is rotated through the transition angles (or range of angles)
Figure 9:
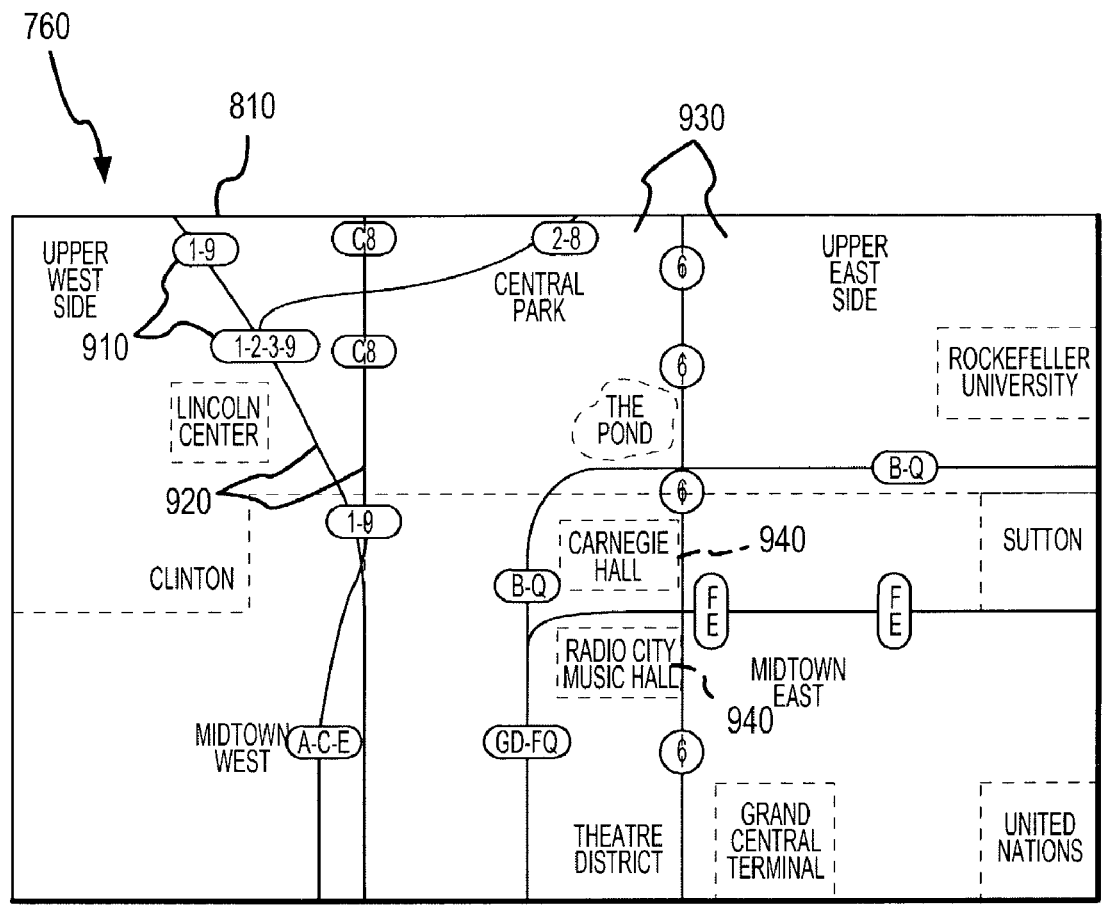

FIGS. 7-9 illustrate one embodiment of the invention in which ghosting is allowed between adjacent layers or data sets. In FIG. 7, a viewing process 700 is shown in which a viewer 704 views a map 710 (or other multi-layered spatial data device) at several angles. At a first position or viewing angle, the viewer 704 view 716 the map 710 and sees a first image 714 corresponding to a first layer data set (such as data set 120), and the first image 714 may be the same as image 314. As the map 710 is rotated 711 about point 712 the first image 714 is visible 716 until the first transition angle, $\theta_A$, (i.e., until the second viewing angle is reached) at which point the data of the first layer shown in the first image 714 phases into a ghost image or secondary image that is visible 742 in the second image 740 along with the primary image corresponding to the second layer data set (such as set 130). The ghosted or combined image 740 is shown in FIG. 8 with a framework 810 defined by shared spatial alignment data (the same framework 810 would be used in the first image 714) and shows primary information, i.e., the neighborhoods 820 and landmarks 830, along with the secondary, ghosted information, i.e., the streets 840 which are shown lighter to indicate ghosting from the first image 714. The combined or ghosted image 740 is useful for viewing two sets of information from adjacent layers or images. The ghosted image 740 is generally visible the entire time that the second layer data set is viewed or as shown, until a next transition or viewing angle, $\theta_B$, is rotated 711 through at which point the image 720 is visible 724 to the viewer containing only information from the second layer data set (such as data set 130 shown in FIG. 5).

The image 720 is then visible until the map 710 is rotated to a next viewing or transition angle, $\theta_C$, at which point all or a portion of the information in image 720 (i.e., data in set 130 or second layer data set) phases into a ghost or secondary image while the primary image of image or view 760 is based on information in the third layer data set (such as set 140 of FIG. 1). The image 760 visible 766 by the viewer 704 is shown in FIG. 9 and includes a primary image including data from the third layer data set, i.e., the subway graphical and text images 910, 920 and a secondary or ghost image including data from the second layer data set, i.e., the neighborhoods 930 and landmarks 940. The combined image (of the two adjacent images or data layers) remains visible the entire time the image from the third layer data set is visible or as shown, until a next transition or viewing angle, $\theta_D$, is rotated 711 through with the map 710 at which point the viewer 704 views 738 a next image or view 730 based on the spatial alignment of only data in the third data layer set (such as image 330 shown in FIG. 6). The information that is intentionally ghosted between layers may be all or a portion of the information provided in each layer and may bleed through to just the next or adjacent view or data layer or may bleed through to all or a number of later views or images. The data shown in the images in FIGS. 4-6, 8, and 9 is provided as useful examples but is not considered limiting as the content that is included in each layer data set may vary significantly to practice the invention.

Figure 10:
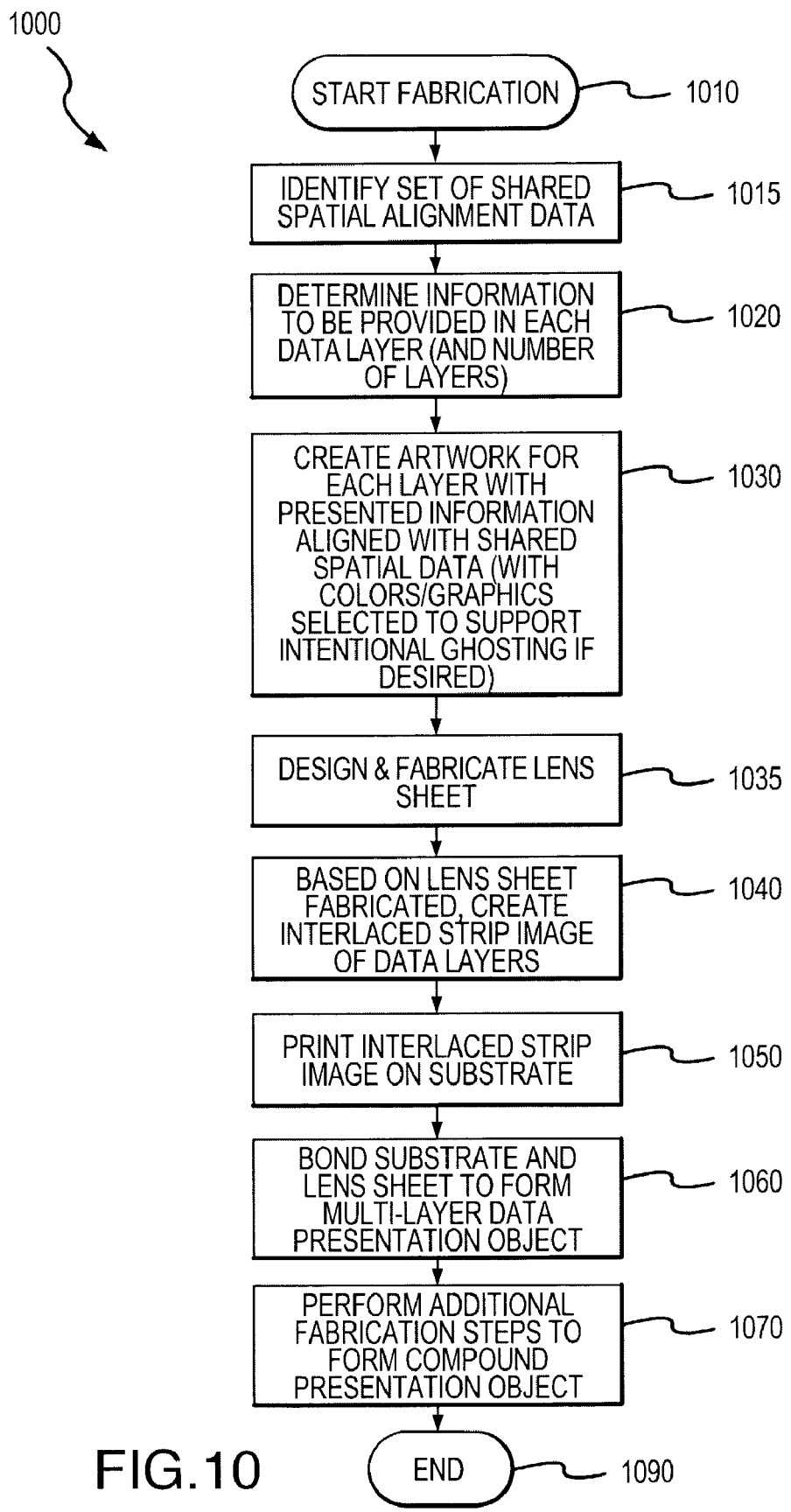
FIG. 10 is a flow chart providing exemplary steps of a process for manufacturing maps and other objects according to the present invention.

FIG. 10 illustrates one exemplary fabrication process 1000 for making a map or other object according to the invention. The process 1000 begins at 1010 typically with the planning of the map or object and continues at 1015 with the identification of set of shared spatial alignment data. Typically, the identification step 1015 includes first determining a market for the map or object (such as tourists of a particular country, state, region, or city or medical students or city planners or engineers) and then a definition of the level of detail to be provided, i.e., the spatial area to be included or covered by the map or object. For example, the spatial area to be covered may be a city and its outlying areas, and the set of spatial alignment data 1015 would then be a scale for presenting the data and coordinates of at least an outer boundary of the area such that the outer boundary can be used as a reference system or framework for any included spatial data for the map or object.

At 1020, the information to be provided on the map or object is determined and the identified information is divided into a number of data sets for presentation in layers or different views. At 1030, the process 1000 continues with the creation of an image representing the data identified in step 1020 with information (graphic and text) of each layer data set being spatially aligned with the spatial alignment data or framework selected in step 1015. The artwork is preferably created and optimized to achieve a desired visual quality level and effects (i.e., to present the information in a visually pleasing and differentiating fashion). Also, at 1030, the images are preferably created to obtain a desired level of ghosting between the various data sets or layer images as discussed with reference to FIGS. 7-9. At 1035, a lens sheet is designed to support the viewing of the number of layers or images created in step 1030 and to provide useful fields of image by properly selecting the pitch of the lens sheet and the viewing angles and viewing distances of the lenticules. Also, at 1035, the lens sheet is fabricated according to standard practices.

At 1040, based on the lens sheet configuration (e.g., based on sheet frequency or LPI), the multiple images created in step 1030 are combined by interlacing alternating horizontal (or vertical depending on the sheet configuration) strips from each image. The resulting compound image can be said to be calibrated to the lens sheet that typically has between 10 and 200 LPI (and, typically, is formed after verifying characteristics of the produced sheet to account for manufacturing tolerances or variances). The interlaced image is then at 1050 printed on a substrate (such as a clear or opaque plastic sheet) or directly onto the lens sheet and at 1060 the substrate is bonded onto the back of the lens sheet with the printed image abutting the flat side of the lens sheet. The printed compound image is carefully aligned with the lens sheet to insure proper visual effects (such as with the strips parallel and, typically, overlapping the elongate lens in the sheet). At 1070, additional fabrication steps may be performed such as those described below with reference to FIGS. 11-13 or finishing processes such as cutting out individual maps or objects if multiple maps or objects are formed in sheeting and printing operations. At 1090, the process 1000 is ended.

Figure 11:
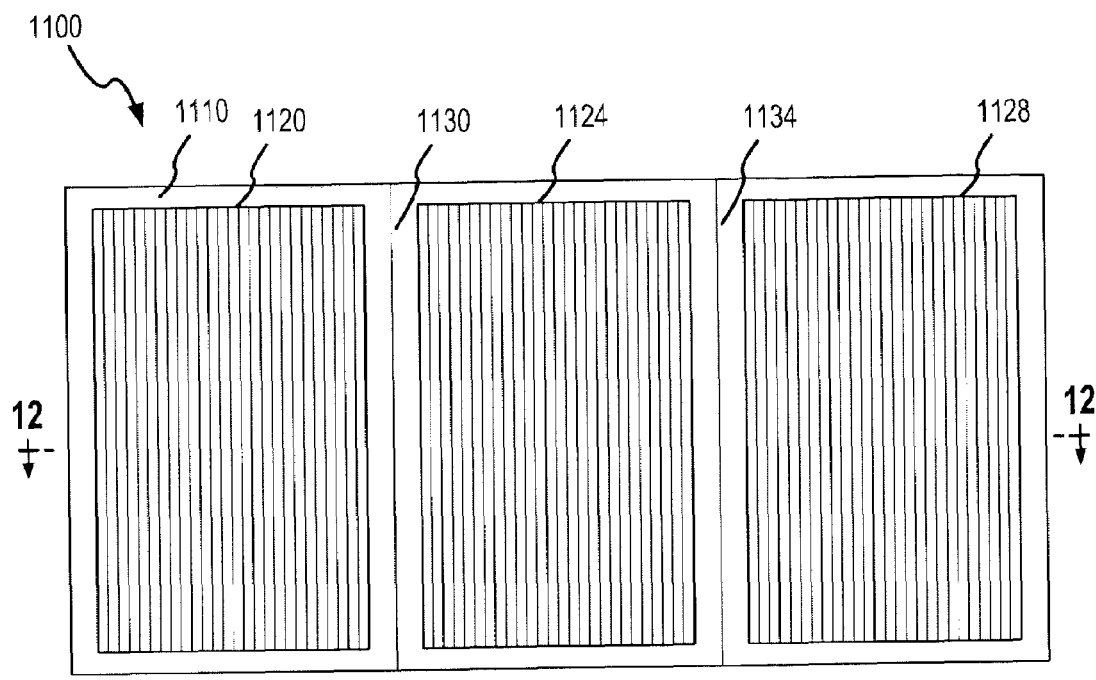
FIG. 11 is a plan view of a map or other object fabricated with sheets divided by folds such that adjacent lens sheets can be folded or accordioned for ease of use (similar to standard paper maps)
Figure 12:
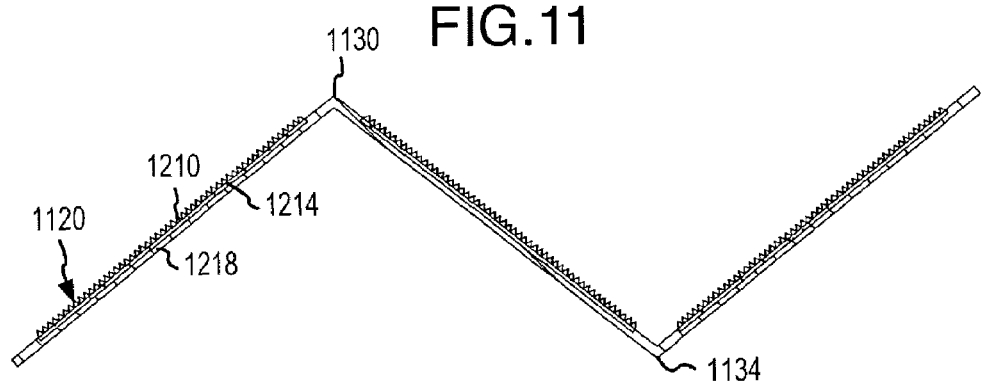
FIG. 12 is a sectional view of the map or other object of FIG. 11.

FIGS. 11 and 12 illustrate a map 1100 that is formed by combining several map sections 1120, 1124, 1128 that are framed with boundaries 1110 and divided by folds 1130, 1134. Each map section 1120, 1124, 1128 may include a lens sheet, a substrate, and a sandwiched compound or interlaced image that provides a number of layers or sets of data that is aligned with a shared spatial alignment data set. As shown, the folds 1130, 1134 typically are formed of a thinner section of plastic (such as the same or different plastic as used for the substrate). A map section 1120 (and 1124, 1128) includes a lens sheet or lenticular material 1210 bound to a substrate 1218 with an interlaced or compound ink or printed image 1214 sandwiched therebetween. Typically, the map 100 is formed by forming the lenticular lens layer containing a plurality of lens areas, printing a corresponding and aligned set of interlaced images on a substrate, and then bonding the substrate to the lenticular lens layer. The map 1100 can then be folded or bent at the thinner folds 1130, 1134.

Alternatively, the map 1100 can be printed in sections, which are then joined together, e.g., as described in U.S. Pat. No. 5,273,432, which is incorporated herein in its entirety by reference and describes a method for making a folding laminated map with an improved hinge and image retention. The map is separated into two or more discrete partial panels and printed on a single sheet of material. The space between panels is blank, and becomes the hinge. The map can also be printed in sections, and mounted on strips of flexible material that serves as a hinge, as is done with folding boards for board games. Still another method of "folding" the map is the unusual folding system used by the "Falk-plan", where the map is dissected into multiple strips, each joined to the next in the middle, with the ends folded back concertina-fashion. The map is intended to stay folded, and the user/viewer flips the "pages" to the left, right, up or down, to display the geographic region desired. The advantage to such a folding system is that one does not need to unfold a large, potentially unwieldy map. The disadvantage is that only a small portion of the map is available for viewing at any given time.

Figure 13:
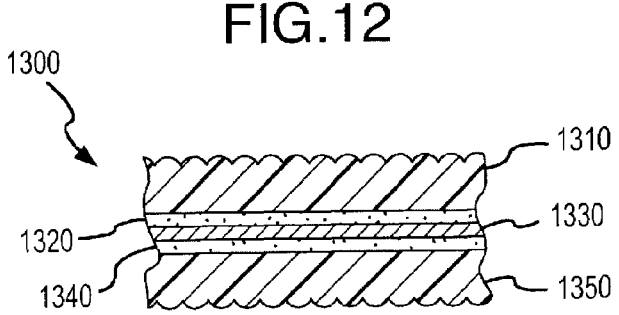
FIG. 13 is a sectional view of a security card or other informational card that is fabricated by sandwiching two printed multiple layer images between two lens sheets to provide viewing on a front and back surface of the card.

FIG. 13 illustrates yet another map or object 1300 formed according to the invention. Form factor may be important for some embodiments and in some embodiments, such as object 1300, it may be desirable to present information on both sides of a planar object 1300. For example, on one side of a map 1300, a first series of data layers may be presented (such as a of a first portion of a city) and on a second side of the map 1300, a second series of data layers may be presented (such as of a second portion of a city). Alternatively, the first and second series of data layers may include different or unrelated content (i.e., different layers of information but mapped to or spatially aligned with the same set of spatial alignment data), which may be useful to provide many layers of data (such as 6 layers or sets of data with 3 layers on each side) about a particular spatial framework (such as a city) with a small form factor. In other cases, the form factor may be as small as a credit card or ID badge and include identification information spatially related on one side and unrelated information on the other side (such as safety information for the building in which the worker is located including evacuation routes).

As shown, the map or object 1300 includes a first or front lens sheet 1310, a first or front interlaced or compound image 1320, a substrate 1330 (and in some cases, the object 1300 may include two substrates bonded to each other), a second or back interlaced or compound image 1330, and a second or back lens sheet 1350. Again, the lens sheets 1310, 1350 may be identical or be configured differently and the images 1320, 1340 may include layer data sets with similar content or with different and even unrelated information.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the use of the invention with maps, such as tourist maps, has been stressed in the above description for ease of understanding and description. It will be understood that the presentation of multiple sets of spatially-related data can be applied to many other objects and to many other fields of industry and topics. For example, one envisioned embodiment involves the use of the invention in the field of medicine and/or biology with the spatial alignment data defining a reference system or framework for a living organism (such as the human body) and a number of data sets or layers being defined and aligned with this framework (such as the organisms components or systems). The invention would be very applicable to engineering or architectural drawings in which multiple systems (such as plumbing, structural, electrical, and the like) are present in a single spatial area (i.e., a building). The number of specific applications are too numerous to be listed in this description but are believed to be included within the breadth of the above description and following claims.

I claim:

1. A method of fabricating a map or other object useful for presenting multiple sets of information to a user in a spatially-related fashion, comprising:
   creating a first image including a first layer data set aligned to a set of spatial alignment data comprising information defining a spatial reference framework including coordinate points;
   creating a second image including a second layer data set aligned to the set of spatial alignment data;
   providing a lens sheet comprising a plurality of parallel lenticules;
   based on the provided lens sheet, combining the first and second images to form an interlaced image comprising image strips from the first and second images;
   printing the interlaced image; and
   bonding a substrate to the lens sheet on a side distal to the lenticules, whereby the printed interlaced image is between the substrate and the lens sheet.

2. The method of claim 1, further including creating a third image including a third layer data set aligned to the set of spatial alignment data and wherein the combining comprises combining the first, second, and third images to form the interlaced image.

3. The method of claim 2, wherein the selected data is a set of mapping coordinates.

4. The method of claim 1, further including prior to the first image creating, selecting data to include in the set of spatial alignment data.

5. The method of claim 1, wherein the lens sheet and the printed image are configured such that the first image is visible to a viewer at a first viewing angle and the second image is visible to the viewer at a second viewing angle.

6. The method of claim 5, wherein the printed image is configured such that at least a portion of the first image and at least a portion of the second image are visible concurrently to the viewer at a transition viewing angle.

7. The method of claim 6, wherein the transition viewing angle is an angle between the first and second viewing angles.

8. The method of claim 6, wherein the first, the second, and the transition viewing angles are each a range of angles measured relative to an initial position of the bonded lens sheet, printed image, and substrate.

9. The method of claim 1, wherein the lenticules of the lens sheet are adapted to have viewing angles of less than about 40 degrees and a viewing distance of less than about 15 inches.

10. A method of fabricating a map useful for presenting multiple sets of information to a user in a spatially-related fashion, comprising:
    creating a first image including a first layer data set aligned to a static spatial reference system comprising a geographic-based framework, wherein the spatial reference system comprises boundaries defined by geo-coded data or geographic information systems data and wherein the framework comprises outer boundaries of a geographical structure;
    creating a second image including a second layer data set aligned to the spatial reference system;
    providing a lens sheet comprising a plurality of parallel lenticules;
    based on the provided lens sheet, combining the first and second images to form an interlaced image comprising image strips from the first and second images; and
    printing the interlaced image on the lens sheet such that the printed interlaced image is viewable through the lenticules.

11. The method of claim 10, wherein the first and second layer data is aligned spatially to the outer boundaries.

12. The method of claim 10, wherein the lens sheet and the printed image are configured such that the first image is visible to a viewer at a first viewing angle and the second image is visible to the viewer at a second viewing angle.

13. The method of claim 12, wherein the printed image is configured such that at least a portion of the first image and at least a portion of the second image are visible concurrently to the viewer at a transition viewing angle.

14. The method of claim 13, wherein the transition viewing angle is an angle between the first and second viewing angles and wherein the first, the second, and the transition viewing angles are each a range of angles measured relative to an initial position of the lens sheet and printed image.

15. A method of fabricating a map or other object useful for presenting multiple sets of information to a user in a spatially-related fashion, comprising:
    creating a first image including a first layer data set aligned to a set of spatial alignment data including an outer framework, wherein the outer framework is included in the first image;

creating a second image including a second layer data set aligned to the set of spatial alignment data, wherein the outer framework is included in the second image;

providing a lens sheet comprising a plurality of parallel lenticules;

based on the provided lens sheet, combining the first and second images to form an interlaced image comprising image strips from the first and second images;

printing the interlaced image on the lens sheet, whereby the first and second images each including the outer framework are visible to a viewer at first and second viewing angles, respectively, and wherein the outer framework of the spatial alignment data is spaced apart from an outer edge of the lens sheet.

16. The method of claim 15, wherein the spatial reference system comprises boundaries defined by geo-coded data or geographic information systems data.

17. The method of claim 15, wherein the framework comprises outer boundaries of a geographical structure and wherein the first and second layer data is aligned spatially to the outer boundaries.

18. The method of claim 15, wherein the lens sheet and the printed image are configured such that the first image is visible to a viewer at a first viewing angle and the second image is visible to the viewer at a second viewing angle.

19. The method of claim 18, wherein the printed image is configured such that at least a portion of the first image and at least a portion of the second image are visible concurrently to the viewer at a transition viewing angle.

20. The method of claim 19, wherein the transition viewing angle is an angle between the first and second viewing angles and wherein the first, the second, and the transition viewing angles are each a range of angles measured relative to an initial position of the lens sheet and printed image.

* * * * *

UNITED STATES PATENT AND TRADEMARK OFFICE
CERTIFICATE OF CORRECTION

PATENT NO. : 7,611,602 B2
APPLICATION NO. : 10/317957
DATED : November 3, 2009
INVENTOR(S) : Ian H. White It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1709 days.

Signed and Sealed this

Twelfth Day of October, 2010

David J. Kappos
*Director of the United States Patent and Trademark Office*